United States Patent
Boyce et al.

(10) Patent No.: US 10,530,866 B2
(45) Date of Patent: Jan. 7, 2020

(54) RECIPE IMPLEMENTATION VIA APPLIANCE NETWORK WITH REMOTE CAPABILITIES

(71) Applicant: WHIRLPOOL CORPORATION, Benton Harbor, MI (US)

(72) Inventors: Daniel P. Boyce, Lawton, MI (US); Christopher W. Kelson, Saint Joseph, MI (US); Saket Singh, Stevensville, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 100 days.

(21) Appl. No.: 15/649,064

(22) Filed: Jul. 13, 2017

(65) Prior Publication Data

US 2019/0020719 A1 Jan. 17, 2019

(51) Int. Cl.
| | | |
|---|---|---|
| *G06F 15/16* | (2006.01) |
| *H04L 29/08* | (2006.01) |
| *G06F 16/9535* | (2019.01) |
| *G06Q 10/06* | (2012.01) |
| *G06Q 30/06* | (2012.01) |
| *G06F 16/958* | (2019.01) |

(52) U.S. Cl.
CPC ........ *H04L 67/125* (2013.01); *G06F 16/9535* (2019.01); *G06F 16/972* (2019.01); *G06Q 10/0631* (2013.01); *G06Q 30/0631* (2013.01); *H04L 67/10* (2013.01)

(58) Field of Classification Search
CPC ... H04L 67/125; H04L 67/10; G06F 16/9535; G06F 16/972; G06Q 10/0631; G06Q 30/0631

USPC ....................................................... 709/217
See application file for complete search history.

(56) References Cited

U.S. PATENT DOCUMENTS

| | | | |
|---|---|---|---|
| 6,121,593 A | 9/2000 | Mansbery et al. |
| 6,690,979 B1 | 2/2004 | Smith |
| 7,523,302 B1 * | 4/2009 | Brown ................ G06F 21/6209 |
| | | | 380/201 |
| 7,933,945 B2 | 4/2011 | Krzyzanowski et al. |
| 8,145,854 B1 | 3/2012 | Lee |
| 8,412,579 B2 | 4/2013 | Gonzalez |
| 8,816,828 B2 | 8/2014 | Ebrom et al. |
| 2002/0009016 A1 * | 1/2002 | Ancona ................ A47J 36/321 |
| | | | 366/205 |
| 2003/0084047 A1 * | 5/2003 | Williamson .......... G06Q 10/10 |
| 2007/0158335 A1 * | 7/2007 | Mansbery ............... F24C 7/082 |
| | | | 219/505 |
| 2009/0037288 A1 | 2/2009 | Christensen |

(Continued)

FOREIGN PATENT DOCUMENTS

EP 3151171 A1 4/2017

OTHER PUBLICATIONS

European Search Report for Counterpart EP18177771.5, dated Dec. 17, 2018.

*Primary Examiner* — Atta Khan
(74) *Attorney, Agent, or Firm* — McGarry Bair PC

(57) ABSTRACT

An application for execution on a mobile device can include access to an appliance registration database that includes a list of registered appliances and access to a recipe database wherein at least one recipe contains a list of appliances needed to prepare the at least one recipe. A comparison module can be configured to compare the list of appliances needed to a list of appliances registered.

12 Claims, 5 Drawing Sheets

(56) References Cited

U.S. PATENT DOCUMENTS

| | | | |
|---|---|---|---|
| 2009/0167506 A1* | 7/2009 | Wong | H05B 6/688 |
| | | | 340/286.02 |
| 2009/0258331 A1* | 10/2009 | Do | G09B 21/003 |
| | | | 434/127 |
| 2010/0192784 A1* | 8/2010 | Shim | F24C 7/082 |
| | | | 99/325 |
| 2012/0136751 A1 | 5/2012 | Ochtel | |
| 2012/0226764 A1* | 9/2012 | Philip | H04L 67/025 |
| | | | 709/208 |
| 2012/0316984 A1* | 12/2012 | Glassman | G06Q 10/06 |
| | | | 705/26.7 |
| 2014/0295822 A1 | 10/2014 | Koo et al. | |
| 2017/0224149 A1* | 8/2017 | Koennings | A47J 27/002 |

\* cited by examiner

RECIPE IMPLEMENTATION VIA APPLIANCE NETWORK WITH REMOTE CAPABILITIES

BACKGROUND

Mobile devices can include applications where a user can browse and select recipes. Recipes typically include list of ingredients needed as well as a list of instructions for preparation of the recipe. The instructions can include information on what appliances to use and specific operating parameters for the appliances. Mobile devices can also include applications for shopping on-line to purchase appliances or to connect to an appliance for purposes of performing operations such starting the appliance.

BRIEF DESCRIPTION

In one aspect, the present disclosure relates to a method of facilitating implementation of a recipe by way of an application executed on a mobile device. The method can include receiving on a server an input from an application, identifying in the server from a database in memory location a list of appliances needed based on the input, comparing on the server the list of appliances needed to an appliance registration database in a memory location, identifying in the server, based on the comparison, at least one appliance in the list of appliances that is not registered, determining in the server a link to where that the at least one appliance may be obtained, and outputting the link to the application.

DETAILED DESCRIPTION

A network can include servers, appliances, and mobile devices that can be in communication over a communications network, such as a middleware or cloud storage. An application programing interface (API), or app, can access the communications network in which digital data from servers can be stored. The app can use a processor on a mobile device to run the app and communicate with the network. Additionally, the app can use an interactive display or user interface on the mobile device to allow for user input in order for a user to manipulate the app.

Databases stored in the communications network can include data relating to a set of recipes or specific appliances registered to a user, which are accessible via the app. A recipe database can include information relating to ingredients required for a recipe and instructions for preparing the recipe, along with information relating to appliances needed to prepare the recipe. Because the app has access to data from the database that includes information relating to appliances registered to a user and the recipe database that includes a known set of appliances needed to prepare a selected recipe, the app can provide information relating to appliances not registered to a user that are needed to prepare the selected recipe. Moreover, the app can be in communication with the communications network that stores data relating to where an appliance can be purchased. The app can communicate to a user the data relating to where to purchase an appliance identified as an appliance not owned by a user.

Figure 1:
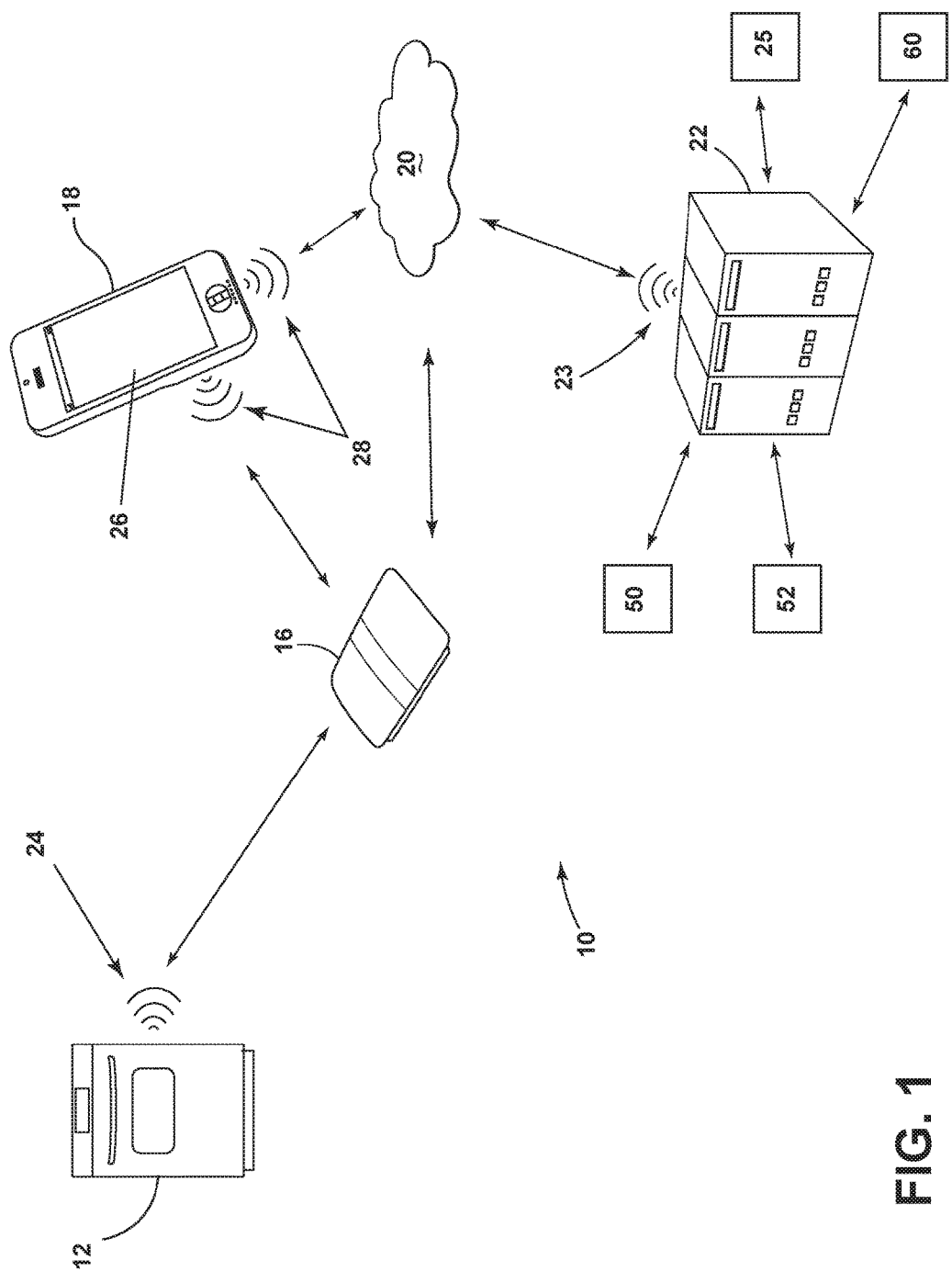
FIG. 1 is a schematic view of a network for exchanging information between a mobile device, a server, and an appliance according to various aspects described herein.

FIG. 1 is a schematic view of a data or communications network 10 according to one aspect of the disclosure. The network 10 can include wired, wireless, or a combination of wired and wireless points or nodes to connect communication paths for exchanging and transporting data. The network 10 can also include one or more networks 10 in communication with each other. Nodes in the network 10 include a server 22 in network communication with a mobile device 18, an appliance 12, and a communications network 20 such as the Internet via a communication module 23. The server communication module 23 enables wired or wireless connection to the communications network 20 and provides for the exchange of information and data between the server 22, the mobile device 18, and/or the appliance 12.

The server 22 can be a general purpose computer or server used by a manufacture, provider, or retailer of goods or services, and can communicate information and data to the network 10, which can include or can provide access to various databases 50, 52 accessible by or stored on the server 22. The databases 50, 52 can include particularized information, such as a registered appliance database 50 and a recipe database 52. The recipe database 52 can contain a listing of recipes searchable by the app user. It is contemplated that the recipe database 52 can include recipes from a third-party or stored by the user.

The registered appliance database 50 can contain information concerning appliance ownership. Information stored in the registered appliance database 50 can originate from a user account. A user can have an account where appliances 12 owned by the user are registered to the account. Registration can include appliance manufacturer and model and geographic location. The registration information can be input to the account by manual user input in an application, by warranty registration processes, or the information can be discovered by an application and transmitted to the user's account. The registered appliance database 50 can additionally include information relating to the capabilities of appliances 12 including whether a particular appliance 12 is Internet connectable.

The server 22 can comprise one or more sets of executable instructions such as a comparison module 60 and a processor to process the executable instruction. Accordingly, the server 22 can be configured to query the databases 50, 52 for information. The server 22 can also have a memory 25 that stores information such as the registered appliance database 50, the recipe database 52, or alternatively, the server 22 could be in network communication with the databases 50, 52. The server 22 can also be used to search data, generate data, such as a message, SMS, MMS, or otherwise send data over the network 10 to the appliance 12 or the mobile device 18. While only one server 22 is shown in FIG. 1, it should be understood that the network 10 can include multiple servers 22. The server 22 can communicate with one or more utility providers, retailers, or manufacturers via the communication network 20 and, in the case where the communications network 20 is the Internet, the server 22, databases 50, 52, mobile device 18 and appliance 12 can all be the same communication network 20.

The mobile device 18 can comprise a processor, a memory, one or more sets of executable instructions and have a mobile communication module 28 for communicating with the network 10 such as an antenna or receiver. The mobile communication module 28 sends and receives messages and data to and from the server 22. Such messages can include text, SMS, MMS, or other types of messages, or transmit or receive data in a form that can be translated and displayed as a message. Mobile devices 18 typically comprise a mobile interactive display 26 which can provide users with access and control of the mobile device 18. While the mobile device 18 is illustrated and generally described in relation to a mobile phone, it can, for example, comprise a smartphone, a tablet computer, a desktop computer, or a notebook computer.

A router 16 is typically used in a home environment, and can be wired, wireless, or both, for communication between a mobile device 18, an appliance 12 and a communication network 10. The router 16 can exchange data and information from the mobile device 18 or appliance 12 with the communication network 20, which can exchange information with the server 22 as needed. Therefore, the mobile device 18, appliance 12, and server 22 can all be in communication with each other through the communication network 20.

While one appliance 12 is shown in FIG. 1, it should be understood that the network 10 can include any number of appliances. The appliance 12 can comprise a processor, memory, and one or more sets of executable instructions and be in communication with a router 16 via an appliance communication module 24. The appliance communication module 24 can be a receiver, having transmission and reception capabilities for sending or receiving messages over the network 10. Such messages can include text, short message service (SMS), multimedia message service (MIMS), or other types of messages, or transmit or receive data in another form that can be translated and displayed as a message.

The appliances 12 of the network 10 can be a home or domestic appliance that performs a particular job in a home, including those relating to cleaning, cooking, or food preservation. The home appliance, for example in the case of an oven 12, can include a housing at least partially defining a cooking chamber (not shown) and having an open face selectively closed for providing access to the cooking chamber. The cooking chamber can receive food item(s) to be cooked, and the appliance 12 can cook the food item(s) according to specific parameters. Other types of appliances include but are not limited to a refrigerator, a stand-mixer, a range, a stove, or a cooktop can be used with the network 10. Other examples of appliance types typically found within a home and which can be used with the system include a refrigerator, a freezer, a clothes washer, or a clothes dryer.

Figure 2:
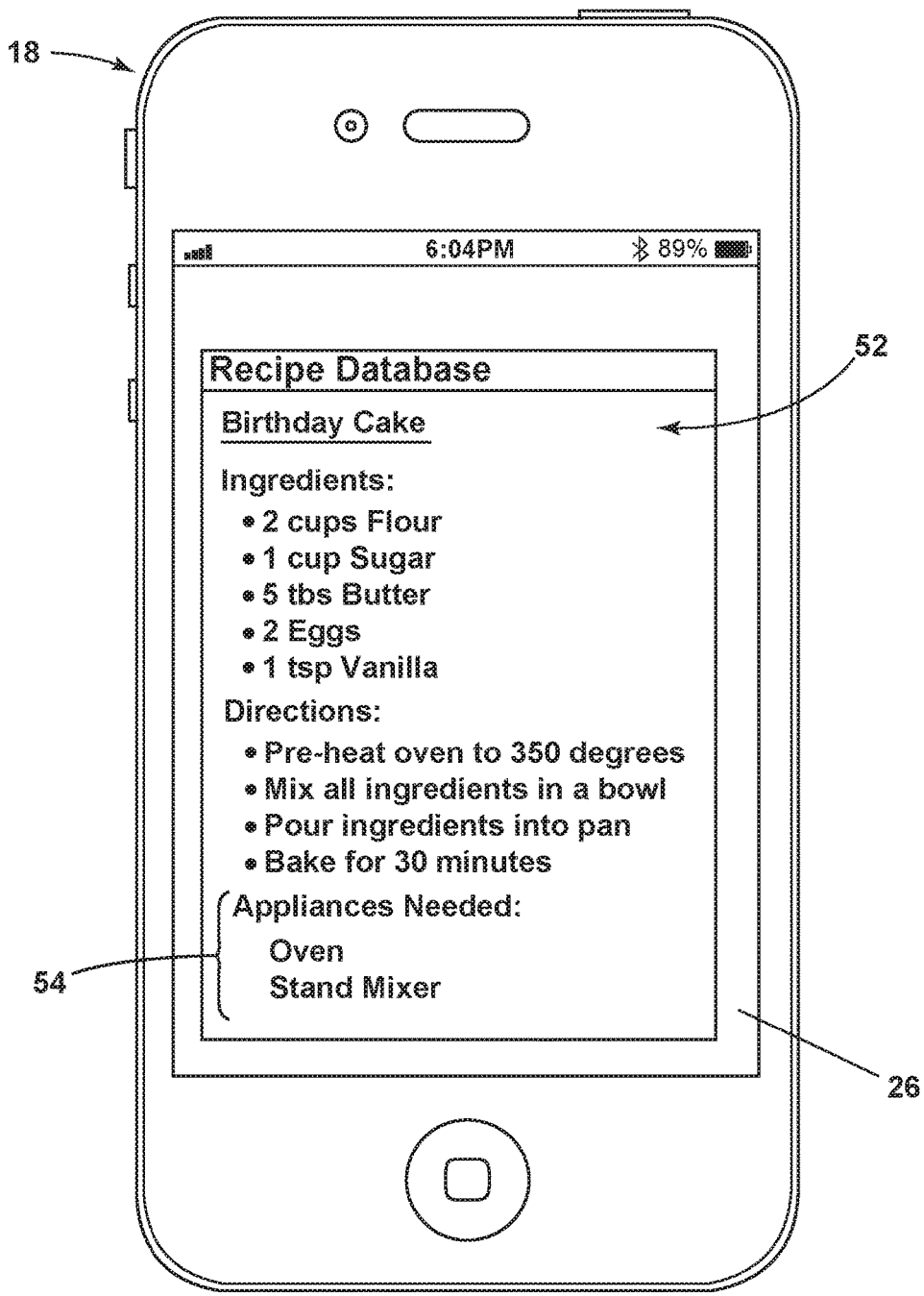
FIG. 2 is a schematic view of a mobile interactive display according to various aspects described herein.

Turning to FIG. 2, the recipe database 52 can be accessible to a user via an application programming interface (API), or app, downloaded and installed on the mobile device 18 and data/information can be displayed on the mobile device's 18 interactive display 26. The recipe database 52 can contain one or more recipes that are searchable by the user. A user can browse recipes in the recipe database 52 and can select a specific recipe using the mobile interactive display 26 on the mobile device 18. Upon selecting a specific recipe from the recipe database 52, the server 22 can transmit and the mobile device 18 can receive the specifics of the selected recipe such as a list of ingredients, a specified amount for each ingredient and cooking/baking instructions. It is also contemplated that along with each recipe, the recipe will contain a list of appliances needed 54 to prepare the recipe. This information or data can be stored with the recipe in the recipe database 52 or can be stored separately in its own database and can also be transmitted from the server 22 in communication with recipe database 52 to the mobile device 18. For example, if a recipe for a cake is selected by a user, the server 22 can transmit and the mobile device 18 can receive and display a list of necessary appliances 54 to prepare the recipe, such as an oven and a stand mixer. While it is described that the recipe database is stored in or is directly linked to the server 22, all or portions of the recipe database 52 could be stored in the memory of the mobile device 18. As such, the app on the mobile device 18 may be programmed with browse and search capabilities of the recipe database 50 rather than performed through the server 22.

Figure 3:
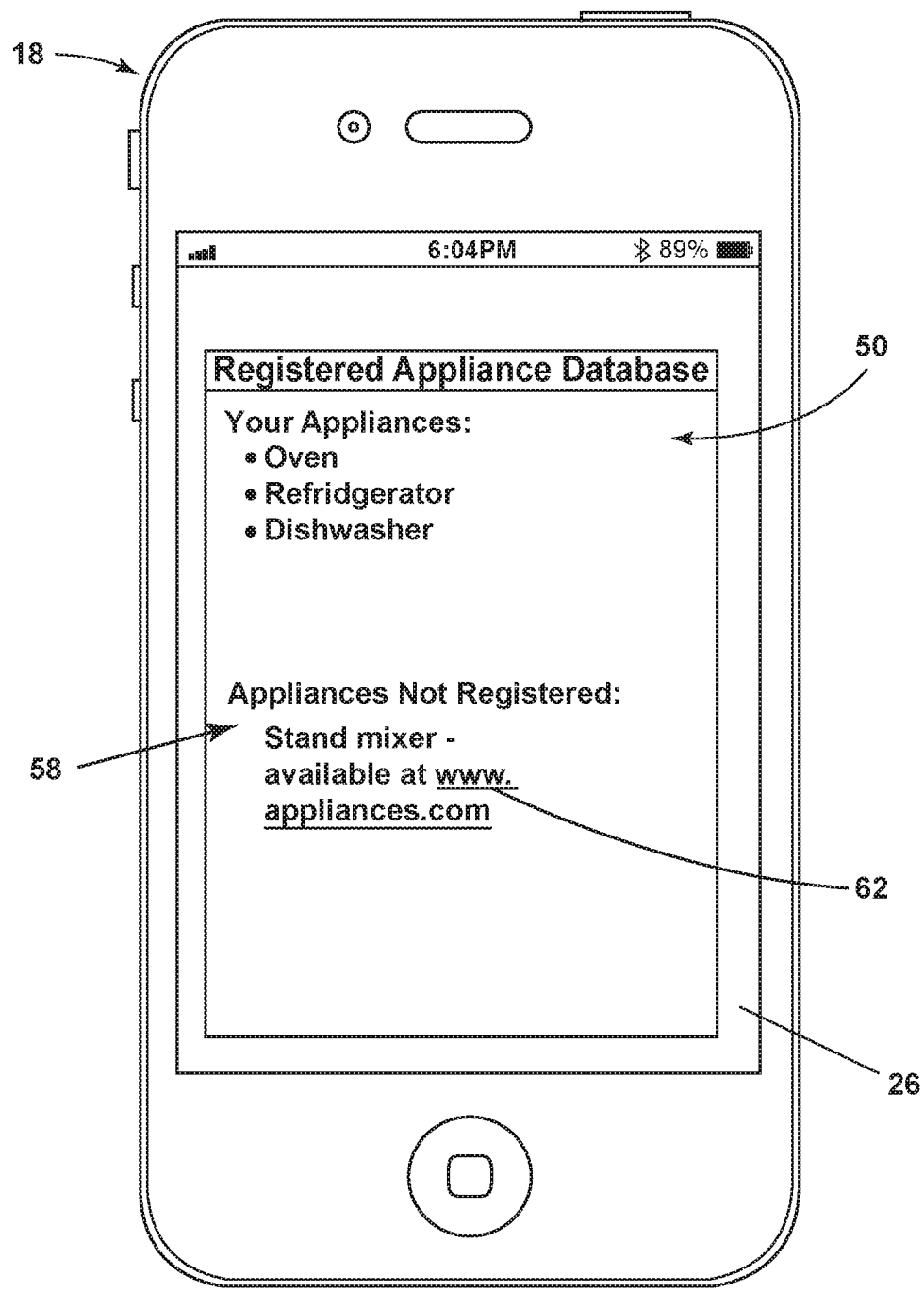
FIG. 3 is a schematic view of a mobile interactive display according to various aspects described herein.

FIG. 3 illustrates additional data/information that can be displayed on the mobile device's 18 interactive display 26. This data/information may be transmitted to the mobile device 18 in addition to, or, separate from the recipe information shown in FIG. 2. It can also be provided as a result of user input such as selecting from a menu option. In this example, it is contemplated that the server 22 or the mobile device 18 can access the registered appliance database 50 and search for a list of appliances registered 56 to a particular owner or user. This information can then be transmitted to the mobile device 18, which can receive and display the list of registered appliances 56 of the user. Similar to the recipe database 52, all or a portion of the registered appliance database 50 may also be stored in the memory of mobile device 18 and assessable and searchable via the mobile device app rather than performed through the server 22.

The comparison module 60 in the server 22 can be configured to compare the list of appliances necessary 54 to the list of registered appliances 54 from the registered appliance database 50. Based on comparison of the list of registered appliances 54 and the list of necessary appliances 54, the comparison module can generate a list of appliances not registered 58. The server 22 can transmit the comparison to the mobile device 18 for display. The list of appliances not registered 58 can also include an executable link 62 to where an appliance 12 identified in the list of appliances not registered 58 can be purchased. The executable link 62 data can be stored in the registered appliances database 52 and can be sent from the server 22 to the mobile device 18 as needed for display on the device 18.

Additionally, it is contemplated that the comparison module 60 in the server 22 can access the registered appliance database 52 and determine if at any of the registered appliances in the list of registered appliances 56 is Internet connectable. If the server 22 determines that any of the appliances in the list of registered appliances 56 is Internet connectable, the server 22 can identify if the Internet connectable appliance is currently connected to the internet. The server 22 can be programmed to automatically start any Internet connected appliance, can send a message to the user asking whether the server 22 should start the appliance 12, or can send a message reminding the user that one or more of their registered appliances is capable of being remote started. As a result, a user can selectively remote start one or more of the registered appliances via the mobile interactive display 26 on the mobile device 18. Alternatively, if the server 22 reminds the user of an appliance remote start capabilities, the application can be programmed to allow the user to send start, stop, and temperature instruction to any currently connected Internet appliance. The details of implementing remote start capabilities between a mobile phone application and an appliance can be found in U.S. Pat. No. 6,690,979, titled Intelligent Appliance Network, filed Feb. 10, 2004, which is hereby incorporated by reference.

While the comparison module 60 is described as a set of executable instructions located in the server 22, it could be in any suitable location such as in the application on the mobile device 18. In the case that the comparison module is in the mobile device, the mobile device 18 can communicate with the server 22 or directly or indirectly with the databases 50, 52 to collect the necessary information to run the comparison. The list of appliances not registered 58 can then be displayed on the mobile device 18.

Figure 4:
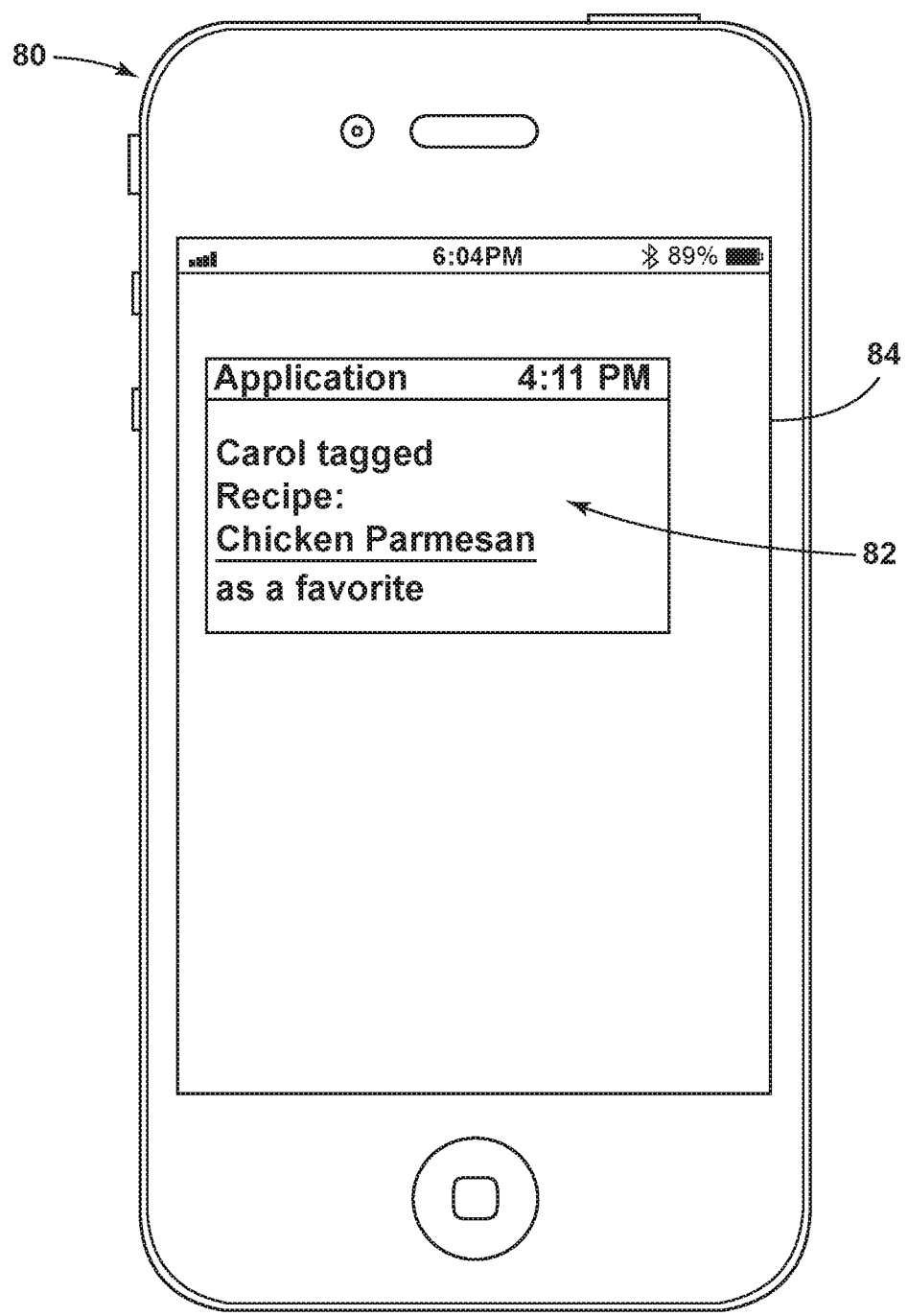
FIG. 4 is a schematic view of a mobile interactive display according to various aspects described herein.

User account stored on the server 22 can be programmed to allow multiple users of the application to have access to the same account. Because multiple users have access to the same account, one user can tag a recipe as a favorite recipe and other users of the same account can be notified that the recipe is tagged as a favorite recipe. As shown in FIG. 4, when one user tags a recipe as a favorite, the application can send notifications 82 to the mobile interactive display 84 of a mobile device 80 of another user to alert other users that another user has tagged the recipe as a favorite recipe.

Figure 5:
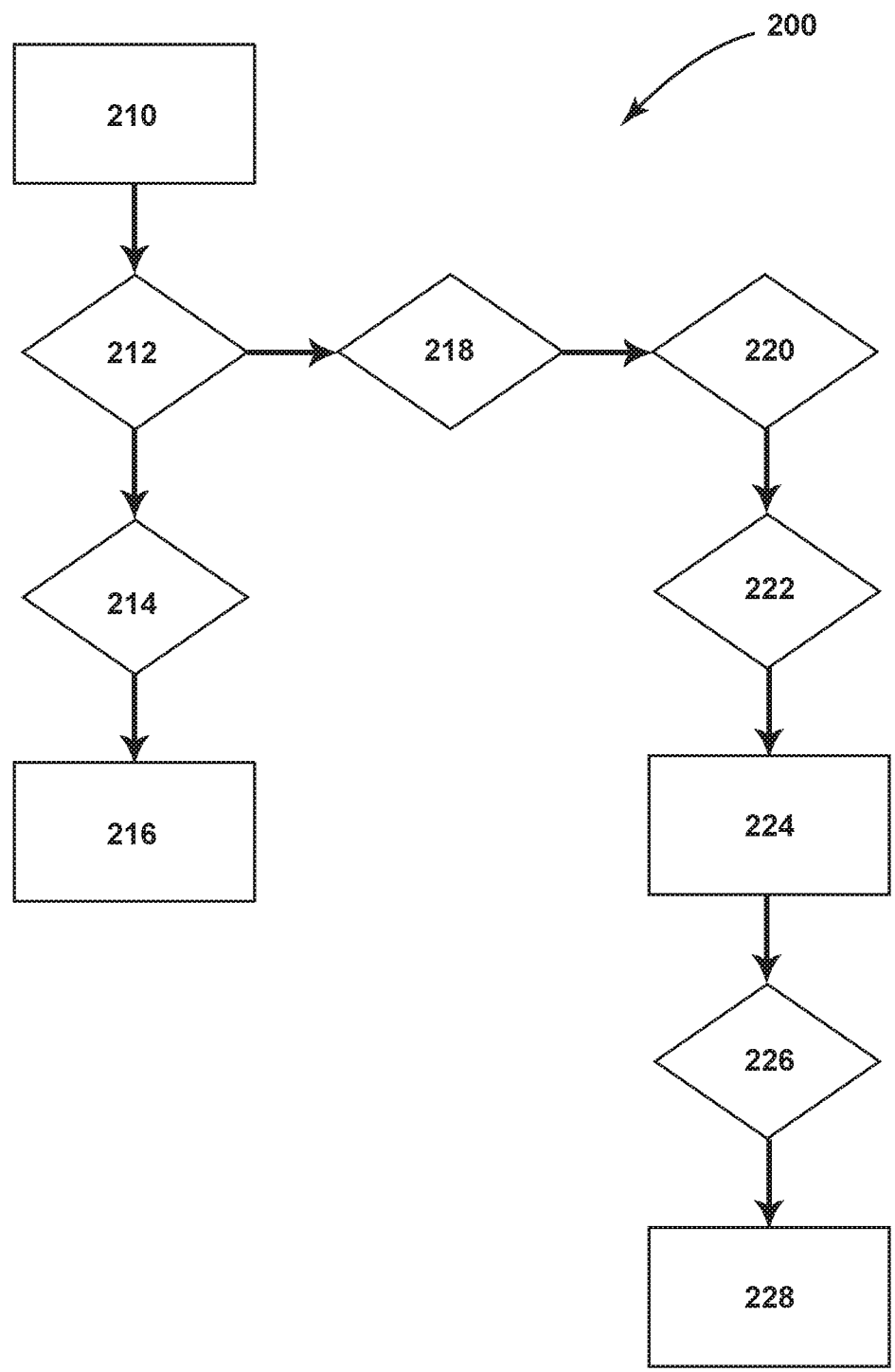
FIG. 5 is a flow chart illustrating a method of facilitating implementation of a recipe according to various aspects described herein.

Turning now to FIG. 5, a method 200 of facilitating implementation of a recipe by way of an application executed on a mobile device is illustrated. The method 200, at 210, includes receiving on a server an input from an application. The input can include a recipe selected from a recipe database. Furthermore, input can additionally include tagging a recipe as a favorite and a list of at least one user associated with an appliance in the appliance registration database. If the additional input is received on the server, the server can output a notification of a tagged recipe to each of the at least one user associated with the appliance in the appliance registration database.

At 212, the server identifies from a database in memory location a list of appliances needed based on the input. Then, a comparison is made on the server of the list of appliances needed to an appliance registration database in a memory location.

At 214, the server can identify based on the comparison at 212, at least one appliance in the list of appliances that is not registered. Then, at 216 the server can determine a link that the at least one appliance can be obtained and the server can output the link to the application. The output can be in the form of a message transmitted to the mobile device.

Optionally, the method can include at 218 identifying in the server, based on the comparison at 212, a list of appliances that are registered. Based on the list of appliances that are registered the method can include at 220, identifying in the server Internet connectable appliances from the list of appliances registered. Then, at 222 the server can identify a signal indicating whether any of the Internet connectable appliances are currently connected to the Internet. At 224, the server can connect to at least one of the Internet connectable appliances so that at 226 the server can identify whether remote start enable mode is set for the at least one Internet connected appliance. If remote start enable mode is set for the at least one appliance, at 228 the server can output remote start instructions from the server to the at least one internet connected appliance. Furthermore, If remote start enable mode is not set for the at least one Internet connected appliance, a second input can be received on the server from the application to remote start at least one Internet connected appliance. The second input can include one of a start, stop, or temperature instruction to the at least one Internet connected appliance. Then, the server can output the one of a start, stop, or temperature instruction to the at least one Internet connected appliance.

To the extent not already described, the different features and structures of the various embodiments can be used in combination with each other as desired. That one feature may not be illustrated in all of the embodiments is not meant to be construed that it may not be, but is done for brevity of description. Thus, the various features of the different embodiments can be mixed and matched as desired to form new embodiments, whether or not the new embodiments are expressly described. All combinations or permutations of features described herein are covered by this disclosure. It should be appreciated that the aforementioned method can be used within alternative appliances.

This written description uses examples to disclose the invention, including the best mode, and to enable any person skilled in the art to practice the invention, including making and using any devices or systems and performing any incorporated methods. The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of facilitating implementation of a recipe, the method comprising:
   receiving on a server an input from an interactive display;
   identifying, in the server from a database in a memory location, a list of appliances needed based on the input;
   comparing, in the server, the list of appliances needed to an appliance registration database in the memory location;
   identifying, in the server, based on the comparison, at least one appliance in the list of appliances needed that is not registered in the appliance registration database;
   determining, in the server, a link to where the at least one appliance that is not registered may be obtained;
   displaying the link on the interactive display;
   identifying, in the server, a list of registered appliances from the appliance registration database, and Internet connectable appliances on the list of registered appliances;
   identifying, in the server, a signal indicating which of the Internet connectable appliances are connected to the Internet;
   connecting the server to at least one of the Internet connectable appliances which are connected to the Internet;
   identifying, in the server, whether a remote start enable mode is set for the at least one of the Internet connectable appliances connected to the server;
   receiving, on the server from a second input from the interactive display, an instruction to remote start the at least one of the Internet connectable appliances; and
   outputting, from the server to the at least one of the Internet connectable appliances, the remote start instruction.

2. The method of claim 1 wherein the input is a recipe selected from a recipe database.

3. The method of claim 2 wherein the recipe database is searchable by at least one user.

4. The method of claim 1 wherein the second input comprises one of a start, stop, or temperature instruction to at least one of the Internet connectable appliances.

5. The method of claim 4 further comprising outputting, from the server, the one of the start, stop, or temperature instruction to the at least one of the Internet connectable appliances.

6. The method of claim 3 further comprising receiving, on the server, a third input from the interactive display tagging a recipe as a favorite.

7. The method of claim 6 further comprising receiving, on the server, a fourth input from the interactive display comprising a list of at least one user associated with at least one appliance in the appliance registration database.

8. The method of claim 7 further comprising outputting, from the server, a notification of a tagged recipe to each of the at least one user associated with the at least one appliance in the appliance registration database.

9. A mobile device, comprising:
a processor in communication with a server; and
a communication device communicatively coupled to the processor for communicating with the server and configured to:
   access a recipe database comprising at least one recipe wherein the at least one recipe contains a list of appliances needed to prepare the at least one recipe;
   access an appliance registration database comprising a list of registered appliances;
   receive a list of appliances not registered being defined as those appliances included in the list of appliances needed to prepare the at least one recipe but not included in the list of registered appliances;
   receive an executable link to obtain at least one appliance from the list of appliances not registered; and
an interactive display configured to display the executable link to obtain the at least one appliance;
wherein the processor is configured to:
   identify Internet connectable appliances from the list of registered appliances;
   identifying, in the server, a signal indicating which of the Internet connectable appliances are connected to the Internet;
   connect, via the server, to at least one of the Internet connectable appliances which are connected to the Internet;
   identify, via the server, whether a remote start enable mode is set for the at least one of the Internet connectable appliances connected to the server;
   receive, from the server, an instruction to remote start the at least one of the Internet connectable appliances displayed on the interactive display; and
   output, through the server to the at least one of the Internet connectable appliances, remote start instruction.

10. The mobile device of claim 9 wherein the processor is further configured to remotely start the at least one of the Internet connectable appliances via the server, when the instruction on the interactive display is activated.

11. The mobile device of claim 10 wherein the interactive display is configured to selectively remote start the at least one of the Internet connectable appliances.

12. A system for implementing a recipe, comprising:
a server having a processor and a memory, the server comprising:
   a recipe database hosted on the server and comprising at least one recipe wherein the at least one recipe contains a list of appliances needed to prepare the at least one recipe;
   an appliance registration database hosted on the server and comprising a list of registered appliances; and
   a comparison module hosted on the server and configured to:
      compare the list of appliances needed to the list of registered appliances, and
      generate the list of appliances not registered, with the list of appliances not registered being defined as those appliances included in the list of appliances needed to prepare the at least one recipe but not included in the list of registered appliances, whereby the list of appliances not registered further comprises an executable link to obtain at least one appliance from the list of appliances not registered; and
   wherein the server is configured to:
      identify, from the appliance registration database, Internet connectable appliances from the list of registered appliances;
      identify a signal indicating which of the Internet connectable appliances are connected to the Internet;
      connect to at least one of the Internet connectable appliances which are connected to the Internet;
      identify whether a remote start enable mode is set for the at least one of the Internet connectable appliances connected to the server;
      receive an instruction to remote start the at least one of the Internet connectable appliances; and
      output, to the at least one of the Internet connectable appliances, a remote start instruction; and
a device comprising:
   a second processor;
   a communication module communicatively coupled to the server; and
   an interactive display configured to display the executable link from the server and display the remote start instruction.

* * * * *